Patented July 27, 1943

2,325,206

UNITED STATES PATENT OFFICE 2,325,206

CATALYST AND PROCESS FOR THE HYDROGENATION OF POLYHYDROXY COMPOUNDS

Leonard A. Stengel, Terre Haute, Ind., assignor to Commercial Solvents Corporation, Terre Haute, Ind., a corporation of Maryland No Drawing. Application May 11, 1940, Serial No. 334,612

3 Claims. (Cl. 260—635)

My invention relates to a process for producing polyhydric alcohols and other valuable products from polyhydric alcohols of higher molecular weight, or from carbohydrates, by catalytic hydrogenation. More specifically, my invention relates to an improved type of catalyst for such a process and to an improved process for employing such catalyst.

It has been known that sugars and polyhydric alcohols may be transformed to polyhydric alcohols of lower molecular weight or lower oxygen content by catalytic hydrogenation. This hydrogenation process is termed "hydrogenolysis" in those instances involving cleavage of a carbon-to-carbon bond in addition to hydrogenation. By this hydrogenation method, for example, sugars such as dextrose or sucrose may be transformed to mannitol, sorbitol, glycerol, propylene glycol and other products in varying proportions. Numerous catalysts have been proposed in the past for utilization in such a process, but these catalysts have had various disadvantages such as high cost, tendency to become poisoned by chlorides and other substances, and inability to operate successfully with crude carbohydrate materials such as molasses.

I have now discovered an improved type of catalyst which, under the alkaline reaction conditions described below, produces consistently high yields of polyhydric alcohols and which is extremely inexpensive to manufacture. My new catalyst is not easily poisoned by chlorides or other common poisons of this class of catalysts, and operates successfully on crude carbohydrate materials such as molasses without the necessity for any prior purification treatment of such crude carbohydrates. My new catalyst initially comprises undried precipitated copper hydroxide which may constitute cuprous or cupric hydroxide, existing either as the true hydroxide or in one of the other hydrated states of the oxide. I prefer to employ a catalyst initially comprising cupric hydroxide, but there is some evidence that this initial material passes through other states before it has an opportunity to act as a catalyst in my process. Some dehydration in the cupric state apparently takes place, followed, apparently, by some reduction due to the presence of alkali and polyhydroxy compounds. The exact state of the copper compound during its catalytic activity in the process is not definitely known, however, and my invention is not to be construed as limited to any particular theory in this respect. The essential element in my invention is the utilization in an alkaline hydrogenation reaction mixture of a catalyst initially comprising precipitated copper hydroxide which has not been allowed to dry following its precipitation and before incorporation into the reaction mixture, and which has preferably been precipitated directly in the reaction mixture itself.

If the copper hydroxide is allowed to dry after precipitation and before utilization in the hydrogenation reaction, its catalytic activity is reduced to such an extent as to make it almost worthless from a commercial point of view. I have found that this diminishing of catalytic activity also takes place, but to a much less extent, if the wet precipitate is allowed to stand for a long period prior to utilization. For this reason it is undesirable to employ a precipitate that has stood longer than a week, and I prefer to use freshly precipitated material.

I have found that a very desirable process for providing freshly precipitated copper hydroxide in the reaction mixture is to effect the precipitation in the reaction mixture itself. For example, if it is proposed to subject molasses in methanol solution to hydrogenolysis, a solution of copper sulfate may be added to the molasses-methanol mixture and caustic alkali may be added to precipitate the cupric hydroxide directly in the reaction mixture. I prefer to employ this procedure since it avoids any possibility of deterioration of the catalyst following precipitation and before utilization in the process. However, it should be noted that this method involves the incorporation of an additional substance into the reaction mixture, i. e., the alkali salt resulting from the reaction of the alkali on the copper salt. It will, of course, be apparent to those skilled in the art that in such a case substances should be chosen which will not produce a salt which is poisonous to the catalyst or otherwise inhibits the hydrogenation reaction. For example, my catalyst, while not poisoned by the amount of chlorides normally present in molasses, may still be poisoned by an excess of chlorides, and for this reason it is preferable not to employ copper chloride for the precipitation of the copper hydroxide. Similarly, nitrates are undesirable in a reaction mixture for hydrogenation of polyhydroxy compounds and should be avoided if possible. Copper sulfate is highly satisfactory in all respects, and in view of its low cost there is little need to attempt to use other copper salts for this purpose.

The amount of copper hydroxide to be employed in the reaction mixture may vary over a considerable range, but in general I prefer to use from 3-5 parts by weight per 100 parts by weight of the polyhydroxy compound to be subjected to hydrogenation. Smaller amounts of copper hydroxide may be employed in some cases, and preliminary experiments will indicate the lower limit which may be employed without decreasing the yields. A considerable excess of catalyst generally has no undesirable effects, and here again it may readily be determined if an additional amount of catalyst is warranted by the increase in yield secured.

For satisfactory operation of the process with my new catalyst, it is necessary to maintain alkaline conditions throughout the reaction. If the reaction mixture is allowed to become acidic prior to the conclusion of the reaction, the yields are seriously decreased. Since acidic products may be formed from sugars or other polyhydric compounds during the course of the reaction, sufficient alkaline material must be provided to neutralize these acidic products and maintain an alkaline reaction at all times. I prefer, therefore, to provide sufficient alkali in the reaction mixture to maintain the pH above 7.0 throughout the entire reaction. This is most conveniently effected by introducing a large excess of alkali into the initial reaction mixture.

In general, the introduction into the initial reaction mixture of from 2 to 15 parts by weight of sodium hydroxide, or an equivalent amount of other alkali metal hydroxide, per 100 parts by weight of the polyhydroxy compound to be hydrogenated, in excess of the amount required to neutralize any initial acidity and the amount required to precipitate the copper hydroxide, will provide a suitable excess of alkali to maintain the desired alkaline conditions throughout the reaction. The optimum amount to be employed will vary within this range, pure sugars or other pure polyhydric compounds usually requiring less alkali than crude materials such as molasses. I generally prefer to employ 2-5 parts of excess alkali per 100 parts of sugar and 3-8 parts of excess alkali per 100 parts of sugar in the molasses. If the mixture is allowed to stand for long periods some of the free alkali may be lost by reaction with the sugar, and additional alkali should then be added to provide the desired amount of free alkali at the beginning of the hydrogenation reaction. However, I prefer to effect the hydrogenation reaction immediately or soon after preparing the initial alkaline reaction mixture.

In employing my new catalyst the general procedures for carrying out this type of hydrogenation reaction which have previously been used may be suitably followed, provided alkaline conditions are maintained during the reaction as described above. The usual types of apparatus for this purpose may be used, as, for example, pressure autoclaves fitted with suitable agitating devices, or reaction vessels of the "rocking bomb" type described in "Reactions of Hydrogen," Homer Adkins, University of Wisconsin Press, 1937, chapter 3. It should be definitely understood that my invention is not limited to any particular type of apparatus or any particular mechanical details for carrying out the reaction.

The hydrogenation process in which my new catalyst may be employed consists essentially in dissolving or suspending the sugar or polyhydric alcohol in a suitable liquid medium, incorporating the undried precipitated copper hydroxide in the resulting mixture, providing the necessary excess of alkali, and introducing hydrogen under superatmospheric pressure while agitating and heating to the desired reaction temperature. The temperature may suitably be maintained constant throughout the reaction, or an initial reaction period at a lower temperature may be followed by a secondary reaction period at a higher temperature. The hydrogen pressure may suitably be maintained substantially constant by continuously or intermittently introducing hydrogen to replace that absorbed by the reaction. The agitation should be sufficient to maintain adequate contact of the reacting materials with the catalyst and to prevent local overheating of the polyhydroxy compounds, which might result in caramelization or charring.

The polyhydroxy compounds suitable for hydrogenation when using my catalyst constitute any of the polyhydroxy aliphatic compounds containing more than two hydroxy groups, such as the carbohydrates and the polyhydric alcohols which contain three or more hydroxy groups. Among the carbohydrates which are particularly suitable for treatment in accordance with my invention are the simple mono- and disaccharides, particularly sucrose, invert sugar, glucose and fructose. Crude sources of such sugars may be employed, and high yields of the lower polyhydric alcohols may be obtained from such materials as high test molasses and crude corn sugar. Likewise, the higher polyhydric alcohols such as sorbitol may be transformed to polyhydric alcohols of lower molecular weight or lower oxygen content. My new catalysts are especially advantageous for the hydrogenation of the crude carbohydrate materials, and particularly high test molasses.

The liquid medium in which the reaction is effected may be chosen in accordance with prior practices in this regard, the mono- and dihydric alcohols being particularly suitable. As examples of suitable solvents for this purpose there may be mentioned methanol, propylene glycol, and 2-ethyl-1-hexanol. Water alone may be employed as the medium in which the reaction is to be effected, but I prefer to employ an aqueous alcoholic medium such as aqueous methanol. A very suitable medium constitutes approximately 3 parts by volume of methanol and one part by volume of water. However, the use of my catalyst is not limited to any particular type of medium and any of the prior practices in this regard may be successfully followed.

A wide range of hydrogen pressure may be utilized when carrying out my process, without substantially affecting the reaction. The optimum pressure in any given case may depend to some extent upon the nature of the material being reacted, and the solubility of hydrogen in the reaction medium. The effective pressure will, of course, constitute the partial pressure of hydrogen in the mixture of hydrogen and vapors of the liquid medium used for the reaction. However, it is generally sufficient to consider the total pressure maintained in the reaction vessel, and I have found that this pressure should preferably be substantially above 1000 lbs. per sq. in., and suitably from 1500-2000 lbs. per sq. in. If the reaction vessel is adjusted to such pressure before heating, an increased pressure will result during heating and prior to hydrogen absorption, after which the pressure may again be adjusted either continuously or intermittently, to the initial value. Pressures above 2000 lbs. may be employed if desired, but satisfactory results are obtainable within the range 1500–2000 lbs. per sq. in.

The temperature and time of reaction to be employed in my process depend primarily on the ratio of products desired. In general, higher temperatures favor the production of lower molecular weight products, whereas lower temperatures favor the production of higher molecular weight products. For the production of propylene glycol as the major product, I prefer to carry out the reaction at a temperature of 210° C.–250° C. and more desirably at 230–240° C. In this temperature range, a considerable amount of glycerol will be formed in addition to the propylene glycol, together with a certain proportion of higher molecular weight polyhydric alcohols. When operating at lower temperatures, e. g., 150° C.–200° C., the major products will constitute the higher alcohols such as sorbitol and mannitol, together with some glycerol and other polyhydric alcohols of intermediate molecular weight, and smaller amounts of propylene glycol. The minimum reaction time for optimum yields will in general vary inversely with the temperature. However, considerably shorter reaction times than required for the optimum yield may be employed without reducing the yield below the limit of practical utility. Also, the reaction mixture may be maintained at the reaction temperature for considerable longer periods than the necessary minimum time without seriously affecting the yields. In general, I prefer to maintain the reaction mixture at 230° C.–240° C. for from 3–4 hours with proportionately longer or shorter periods at higher or lower temperatures.

My invention may be further illustrated by the following specific examples:

Example I

A reaction mixture was prepared containing 100 parts by weight (dry basis) of high test molasses and 143 parts by weight of methanol. Into this mixture was introduced approximately 12.1 parts by weight of copper sulfate

($CuSO_4.5H_2O$)

in the form of a 25% aqueous solution and approximately 8.0 parts by weight of sodium hydroxide in the form of a 30% aqueous solution. This amount of sodium hydroxide was sufficient to precipitate all of the copper and to provide sufficient excess alkali to establish an initial pH of 10.8. The resulting mixture was placed in a reaction vessel of the Adkins rocking bomb type. The air in the reaction vessel was displaced by hydrogen and hydrogen was introduced at a pressure of 1700 pounds per square inch. The temperature was then raised, while agitating the bomb, to 230° C. and was maintained at this point for three hours with continued agitation. During this time, hydrogen was introduced intermittently to replace that absorbed in the reaction, maintaining the pressure in the vessel at approximately 1700 pounds per square inch. At the conclusion of the reaction, the bomb was cooled in a current of cold air, the hydrogen pressure released and the product removed for analysis. The yield of propylene glycol was 43.3%. No analysis was made for higher alcohols.

Example II

A reaction mixture was prepared containing 100 parts by weight (dry basis) of high test molasses and 143 parts by weight of methanol. To this mixture was added approximately 16.1 parts by weight of copper sulfate ($CuSO_4.5H_2O$) in the form of a 25% aqueous solution and approximately 10.4 parts by weight of sodium hydroxide in the form of a 30% aqueous solution. This provided an excess of approximately 5.2 parts by weight of sodium hydroxide per 100 parts by weight of molasses (dry basis) over that required to precipitate the copper oxide. The resulting mixture was subjected to hydrogenation in accordance with the procedure of Example I. A yield of 49.6% propylene glycol was obtained. No analysis was made for higher alcohols.

Example III

A reaction mixture was prepared by dissolving 100 parts by weight of anhydrous dextrose in 24 parts by weight of water and adding 143 parts by weight of methanol. To this mixture was added 12.1 parts by weight of copper sulfate ($CuSO_4.5H_2O$) in the form of a 25% aqueous solution and 10.4 parts by weight of sodium hydroxide in the form of a 30% aqueous solution. The resulting mixture was subjected to hydrogenation in accordance with the procedure of Example I. A yield of 43.3% propylene glycol was obtained. No analysis was made for higher alcohols.

Example IV

A reaction mixture was prepared containing 100 parts by weight (dry basis) of "hydrol greens" (mother liquor from the first crystallization of corn sugar) and 325 parts by weight of methanol. To this mixture was added approximately 14.8 parts by weight of copper sulfate ($CuSO_4.5H_2O$) in the form of a 25% aqueous solution and approximately 9.0 parts by weight of sodium hydroxide in the form of a 30% aqueous solution. The resulting mixture was subjected to hydrogenation in accordance with the procedure of Example I. A yield of 30.7% propylene glycol was obtained. No analysis for higher alcohols was made.

Example V

A reaction mixture was prepared containing 100 parts by weight of the syrupy high boiling residue remaining after the recovery of propylene glycol from a reaction product obtained in accordance with the process of Example II, and approximately 285 parts by weight of methanol. To this mixture was added approximately 13.3 parts by weight of copper sulfate ($CuSO_4.5H_2O$) in the form of a 25% aqueous solution and approximately 7.5 parts by weight of sodium hydroxide in the form of a 30% aqueous solution. The resulting mixture was subjected to hydrogenation in accordance with the procedure of Example I. A yield of 45.5% propylene glycol was obtained. No analysis for higher alcohols was made.

It is to be understood, of course, that the above examples are illustrative only and do not limit the scope of my invention. Other equivalent methods may be employed to obtain precipitated copper oxides for use as catalysts, if care is taken to prevent drying or undue ageing of the oxides after precipitation. Similarly, other alkaline materials may be employed to provide the necessary alkaline condition of the reaction mixture throughout the reaction, and the reaction conditions and mechanical details of effecting the reaction may be varied within wide limits, as previously pointed out. In general it may be said that the use of any equivalents or modifications of procedure which would occur to one skilled in the art, is included within the scope of my invention.

My invention now having been described, what I claim is:

1. In a process in which a sugar-containing material is admixed with a liquid medium and subjected to hydrogenation, the steps which comprise precipitating copper hydroxide in said mixture of sugar-containing material and liquid medium, and effecting the hydrogenation in the presence of the resulting precipitate while maintaining the reaction mixture in an alkaline condition throughout the reaction.

2. In a process in which a solution of high test molasses in methanol is subjected to hydrogenation, the steps which comprise precipitating cupric hydroxide in said solution of molasses and effecting the hydrogenation in the presence of the resulting precipitate while maintaining the pH of the reaction mixture above 7.0 throughout the reaction.

3. In a process in which a solution of high test molasses in methanol is subjected to hydrogenation, the steps which comprise introducing into said solution of molasses, an aqueous solution of copper sulfate and sufficient alkali to precipitate said copper sulfate as cupric hydroxide and to provide excess free alkali equivalent to 2-15 parts by weight of sodium hydroxide per 100 parts by weight of sugar in said molasses, and effecting the hydrogenation in the presence of the resulting precipitate.

LEONARD A. STENGEL.